United States Patent
Hernandez et al.

(10) Patent No.: US 12,556,677 B2
(45) Date of Patent: Feb. 17, 2026

(54) ONLINE CALIBRATION OF DISPLAY ALIGNMENT IN A HEAD-WORN DEVICE

(71) Applicant: GOOGLE LLC, Mountain View, CA (US)

(72) Inventors: Joshua Anthony Hernandez, Redwood City, CA (US); Zhiheng Jia, Sunnyvale, CA (US); Chao Guo, Los Altos, CA (US); Qiyue Zhang, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 135 days.

(21) Appl. No.: 18/507,653

(22) Filed: Nov. 13, 2023

(65) Prior Publication Data

US 2024/0171726 A1    May 23, 2024

Related U.S. Application Data

(60) Provisional application No. 63/383,849, filed on Nov. 15, 2022.

(51) Int. Cl.
*H04N 13/327* (2018.01)
*G02B 27/01* (2006.01)
(Continued)

(52) U.S. Cl.
CPC ....... *H04N 13/327* (2018.05); *G02B 27/0172* (2013.01); *G02B 27/0179* (2013.01);
(Continued)

(58) Field of Classification Search
CPC .. H04N 13/327; H04N 13/344; H04N 13/383; H04N 13/398; H04N 13/366;
(Continued)

(56) References Cited

U.S. PATENT DOCUMENTS

| | | | | | |
|---|---|---|---|---|---|
| 5,267,331 | A | * | 11/1993 | Siwoff | G09B 21/008 348/E13.067 |
| 5,359,675 | A | * | 10/1994 | Siwoff | H04N 19/597 348/E13.067 |

(Continued)

OTHER PUBLICATIONS

Qiu, A high-precision calibration approach for Camera-IMU pose parameters with adaptive constraints of multiple error equations Measurement, ISSN: 0263-2241, vol. 153, p. 107402, Publication Year 2020.*

*Primary Examiner* — Frank F Huang
(74) *Attorney, Agent, or Firm* — Brake Hughes Bellermann LLP

(57) ABSTRACT

A method for determining a transformation between frames of reference for two inertial measurement units (IMUs) is disclosed. The transformation includes biases associated with the measurements of each of the IMUs and the extrinsic details can include relative differences in the position and orientation of the IMUs. The IMUs may be mechanically coupled to a frame so that their movements are related. The IMUs can be coupled to a pair of displays in a head-mounted device (e.g., smart glasses) so that a display spacing between for a pair of stereoscopic displays can be accurately determined and adjusted to match the eyes of the user.

22 Claims, 8 Drawing Sheets

(51) Int. Cl.
*H04N 13/344* (2018.01)
*H04N 13/383* (2018.01)
*H04N 13/398* (2018.01)

(52) U.S. Cl.
CPC ......... *H04N 13/344* (2018.05); *H04N 13/383* (2018.05); *H04N 13/398* (2018.05); *G02B 2027/0134* (2013.01); *G02B 2027/0178* (2013.01); *G02B 2027/0187* (2013.01)

(58) Field of Classification Search
CPC ............ G02B 27/0172; G02B 27/0179; G02B 2027/0134; G02B 2027/0178; G02B 2027/0187
See application file for complete search history.

(56) References Cited

U.S. PATENT DOCUMENTS

| | | | | |
|---|---|---|---|---|
| 5,526,178 A * | 6/1996 | Goldstein | ............... | A42B 1/247 359/399 |
| 6,591,008 B1 * | 7/2003 | Surve | ........................ | G06T 5/90 382/167 |
| 6,611,618 B1 * | 8/2003 | Peli | ............................ | G06T 5/73 382/199 |
| 8,130,263 B2 * | 3/2012 | Chang | ................... | H04N 9/3182 359/630 |
| 8,311,328 B2 * | 11/2012 | Spruck | ....................... | G06T 5/92 382/172 |
| 9,063,352 B2 * | 6/2015 | Ford | ........................ | G02C 7/044 |
| 9,077,915 B2 * | 7/2015 | Kolstad | ................... | H04N 23/20 |
| 2004/0013314 A1 * | 1/2004 | Peli | ............................ | G06T 5/10 382/254 |
| 2004/0136570 A1 * | 7/2004 | Ullman | ...................... | G06T 5/75 382/114 |
| 2009/0195652 A1 * | 8/2009 | Gal | ............................ | B60R 1/28 348/148 |
| 2011/0164122 A1 * | 7/2011 | Hardacker | ............ | H04N 13/398 348/56 |
| 2016/0137129 A1 * | 5/2016 | Mawhinney | ............... | B60R 1/26 348/148 |

* cited by examiner

ONLINE CALIBRATION OF DISPLAY ALIGNMENT IN A HEAD-WORN DEVICE

CROSS REFERENCE TO RELATED APPLICATION

This application claims the benefit of U.S. Provisional Application No. 63/383,849, filed Nov. 15, 2023, the disclosure of which is incorporated herein by reference in its entirety.

FIELD OF THE DISCLOSURE

The present disclosure relates to devices that utilize multiple inertial measurement units (IMUs) for position sensing and more specifically, to a method for determining a transformation between the coordinate frames (i.e., frames, poses) of a pair of IMUs.

BACKGROUND

A head-mounted device (i.e., head-worn device) may be configured to provide a user with a virtual reality (VR) or augmented reality (AR) experience. For example, the head-mounted device may be implemented as smart glasses in an optical see-through (OST) configuration in which virtual content can be displayed on a heads-up display (HUD) through which the user can view the world. Alternatively, the head-mounted device may be implemented as smart glasses in a video see-through (VST) configuration in which virtual content can be displayed on a display on which the user can view images of the world captured by a camera. In either case, the displayed content may be presented to both eyes of the user in a binocular display. The quality of this binocular (i.e., stereoscopic) display may require the images to be aligned for each eye.

SUMMARY

A binocular (i.e., stereoscopic) display may include a left display and a right display. Each display can have its own frame of reference determined by its position and orientation. The quality of the stereoscopic display may require knowledge of the difference between these frames of references. The disclosed systems can perform an online calibration method to generate a transformation between the frames of reference. The transformation includes a displacement between the frames of reference.

In some aspects, the techniques described herein relate to a computer readable medium storing executable instructions that when executed by at least one processor cause the at least one processor to execute operations, the operations including: obtaining a first measurement of a movement of a head-mounted device using a first inertial measurement unit mechanically coupled to a left display of the head-mounted device, the first inertial measurement unit having a first frame of reference corresponding to a position and orientation of the left display; obtaining a second measurement of the movement of the head-mounted device using a second inertial measurement unit mechanically coupled to a right display of the head-mounted device, the second inertial measurement unit having a second frame of reference corresponding to a position and orientation of the right display; estimating a transformation between the first frame of reference and the second frame of reference based on the first measurement and the second measurement; and determining a display spacing between the left display and the right display based on the transformation.

In some aspects, the techniques described herein relate to a head-mounted device including: a first inertial measurement unit mechanically coupled to a left display for a left eye of a user, the first inertial measurement unit having a first frame of reference; a second inertial measurement unit mechanically coupled to a right display for a right eye of the user, the second inertial measurement unit having a second frame of reference; a frame mechanically coupling the left display and the right display; and a processor configured by software instructions to perform a display calibration including: obtaining a first measurement of a movement of the head-mounted device using the first inertial measurement unit; obtaining a second measurement of the movement of the head-mounted device using the second inertial measurement unit; estimating a transformation between the first frame of reference and the second frame of reference based on the first measurement and the second measurement; and updating a calibration based on the transformation.

In some aspects, the techniques described herein relate to a head-mounted device including: a positioner configured to move a left display and/or a right display of the head-mounted device; a left eye-tracking camera configured to measure a left eye position of a user wearing the head-mounted device; a right eye-tracking camera configured to measure a right eye position of the user wearing the head-mounted device; a first inertial measurement unit mechanically coupled to a left display for a left eye of a user, the first inertial measurement unit having a first frame of reference; a second inertial measurement unit mechanically coupled to a right display for a right eye of the user, the second inertial measurement unit having a second frame of reference; a frame mechanically coupling the left display and the right display; and a processor configured by software instructions to: obtain a first measurement a movement of the head-mounted device using the first inertial measurement unit; obtain a second measurement of the movement of the head-mounted device using the second inertial measurement unit; estimate a transformation between the first frame of reference and the second frame of reference based on the first measurement and the second measurement; determine a display spacing between the left display and the right display based on the transformation; determine an eye spacing between the left eye and the right eye based on the left eye position and the right eye position; and control the positioner to move the left display and/or the right display based on the eye spacing and the display spacing, the movement creating a new display spacing between the left display and the right display.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A head-mounted device (HMD) may include a left display and a right display positioned in front of each eye of a user. The relative position of the displays with respect to the eyes of a user can affect the viewing experience for a user. For example, displays that are aligned with the eyes of a user can maximize a visual field for the user and minimize distortions. Because users have different eye spacings, a head-mounted device may include a positioner that can adjust a displacement between the displays so that it corresponds to a separation between the eyes of the user in order to improve a visual experience. This adjustment may occur automatically but sensing the separation (i.e., displacement) of the displays using a conventional approach (e.g., hall sensor) may be problematic. The convention approach may lack accuracy and/or may not be mechanically/electrically compatible with a head-mounted device. Furthermore, a factory-set calibration relating the sensor data to positions may become outdated through changes to the head-mounted device caused by use and environment. The disclosed head-mounted device includes a position sensor (i.e., IMU) coupled to each display. The IMU can be used to determine a display displacement for the display positioning. The display displacement may be computed while a user is operating the head-mounted device (i.e., online) so that misalignments may be responded to as they happen and without user intervention. The disclosed approach can accommodate for the bias errors introduced by each IMU so that the displacement measured is more accurate than other approaches.

Figure 1:
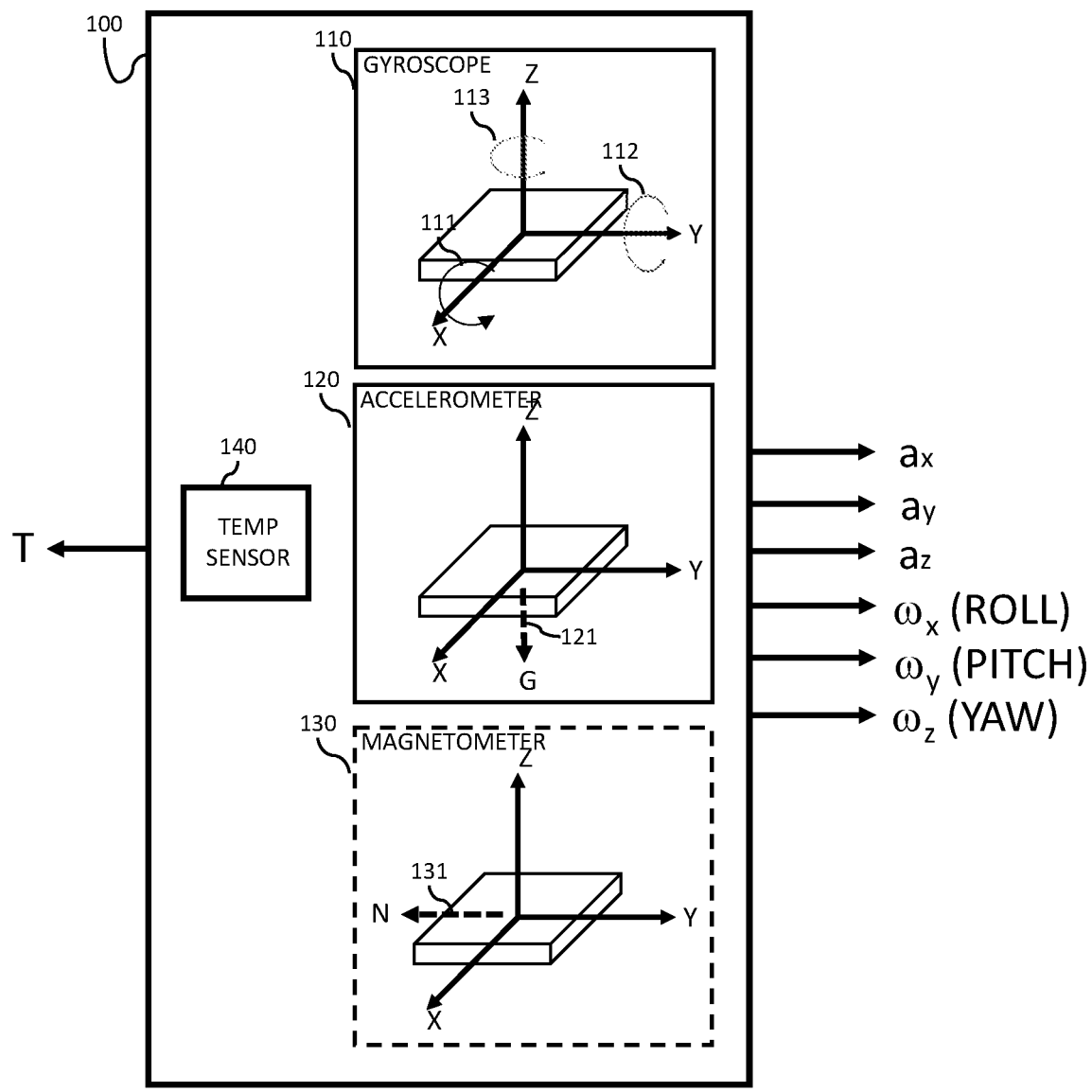
FIG. 1 is a system block diagram of an IMU configured for a 6DOF measurement according to a possible implementation of the present disclosure.

FIG. 1 is a system block diagram of an IMU for the motion-tracking device shown in FIG. 1. The IMU 100 may output a motion tracking measurement having six components (i.e., 6 degrees of freedom (DOF)). The six DOF are relative to a coordinate system (i.e., frame of reference) of the IMU 100. The frame of reference of the IMU may be a coordinate system aligned with the edges of an IC circuit package containing the IMU.

The IMU 100 includes a gyroscope module 110 configured to measure a first angular velocity 111 (i.e., $\mathsf{l}_x$) around an X-axis of the coordinate system (i.e., ROLL). The gyroscope module 110 is further configured to measure a second angular velocity 112 (i.e., $\mathsf{l}_y$) around a Y-axis of the coordinate system (i.e., PITCH). The gyroscope module 110 is further configured to measure a third angular velocity 113 (i.e., $\mathsf{l}_z$) around a Z-axis of the coordinate system (i.e., YAW) associated with the HMD.

A gyroscope of the IMU 100 may be implemented as a micro-electromechanical system (MEMS) in which a movement of a mass affixed to springs can be capacitively sensed to determine rotation. The alignment of the mass and the springs can determine the axis of the sensed rotation. Accordingly, the IMU 100 may include three MEMS gyroscopes, each aligned to sense a corresponding rotation around an axis of the coordinate system.

The IMU 100 may further include an accelerometer module 120 configured to measure a first linear acceleration ($a_x$) in an X-direction; a measure a second linear acceleration ($a_y$) in a Y-direction; and a third linear acceleration ($a_z$) in a Z-direction. The accelerometer module 120 of the IMU 100 may be implemented as a MEMS configured to capacitively sense a force (e.g., gravity 121) exerted on a movable mass to determine an acceleration. The accelerometer may sense displacement or velocity by processing (e.g., integration) the acceleration over time.

The mechanical nature of the MEMS sensors described above can make their responses sensitive to changes in temperature and/or to changes in their installed environment. For example, a temperature change or a force due to use (or misuse) of the motion-tracking device can alter the sensitivity of the MEMS devices. For example, dropping or bending the motion-tracking device can cause a change in the installed environment, thereby changing the response of a gyroscope or an accelerometer of the IMU.

The changes described above can make the sensed (i.e., measured) rotations and/or displacements differ from the actual rotations and/or displacements. The differences between a measured parameter (e.g., rotation, displacement) and an actual parameter is referred to as a bias. An output of the IMU may be considered as including an IMU measurement (IMU_MEAS) and a bias (BIAS). When the bias is zero, the measured parameter matches the actual parameter. Accordingly, it may be desirable to reduce the bias for any, or all, outputs of the IMU.

As mentioned above, the bias may be a function of temperature (i.e., BIAS(T)). Accordingly, the IMU 100 may include a temperature sensor 140 within or near the IMU 100 so as to measure a temperature (T) that corresponds to the temperature of the gyroscope module 110 and the accelerometer module 120.

In a possible implementation, the IMU 100 can further include a magnetometer 130 that includes an X-axis magnetometer configured to measure a first magnetic field strength (i.e., $H_x$) an X-direction of the coordinate system, a Y-axis magnetometer configured to measure a second magnetic field strength (i.e., $H_y$) in a Y-direction of the coordinate system, and a Z-axis magnetometer configured to measure a third magnetic field strength (i.e., $H_z$) in a Z-direction of the coordinate system. The magnetic field strengths may be relative to the Earth's magnetic field 131 (i.e., north (N)).

Figure 2:
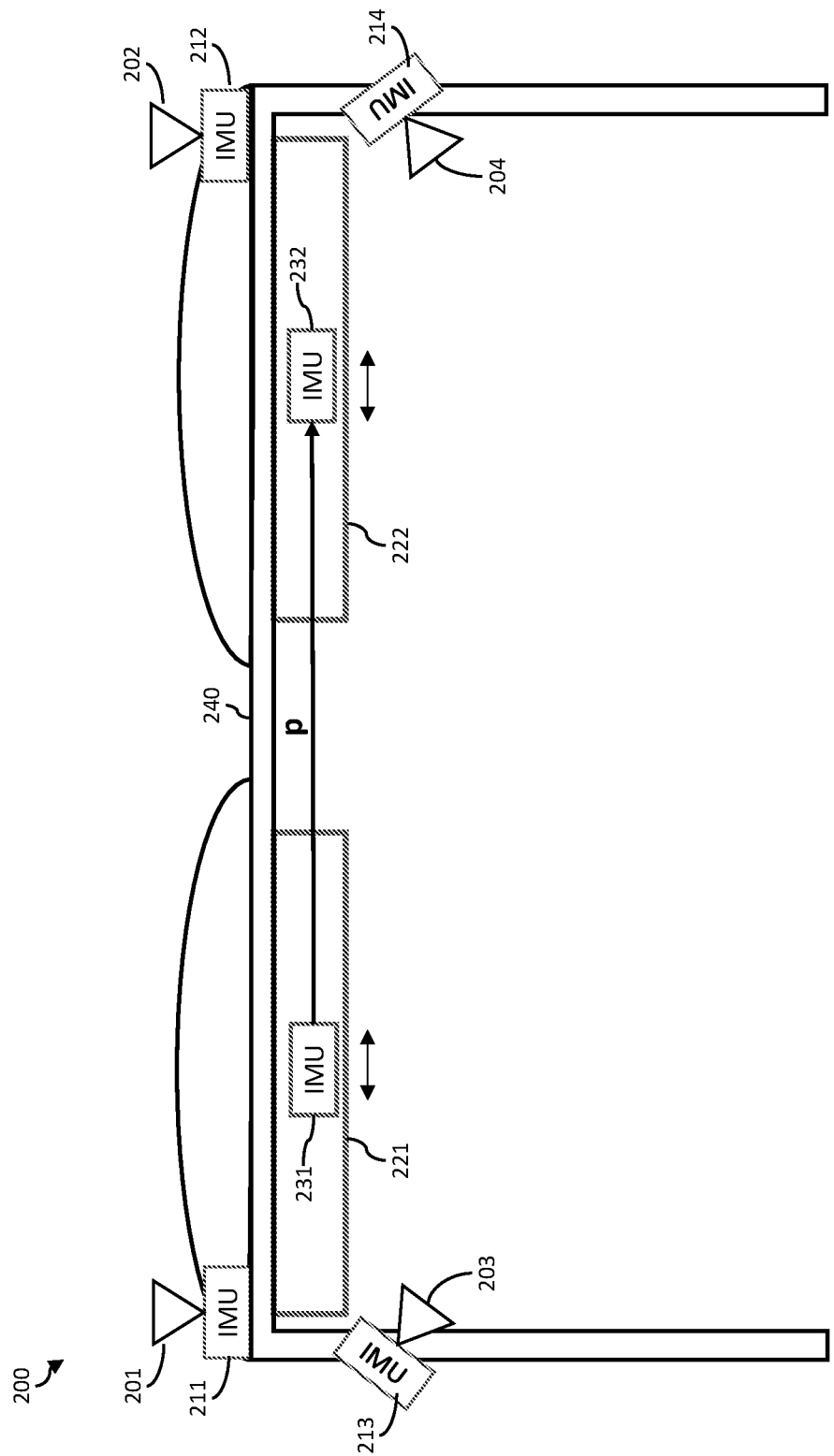
FIG. 2 is a top-view of a head-mounted device 200 in a video see-through (VST) configuration according to a possible implementation of the present disclosure.

FIG. 2 is a top-view of a head-mounted device 200 in a video see-through (VST) configuration according to a possible implementation of the present disclosure. In a possible implementation, a left video see-through camera (i.e., left VST camera 201) is located at a left lens position and a right video see-through camera (i.e., right VST camera 202) is located at a right lens position. Both cameras are directed towards the environment of the user and are configured to capture stereo views of the environment that can be displayed on a pair of binocular (i.e., stereoscopic) displays.

The pair of stereoscopic displays includes a left display 221 located in front of a left eye of the user when wearing the head-mounted device 200. The left display 221 is configured to present a left image of a stereoscopic image to the user. The pair of stereoscopic displays further includes a right display 222 located in front of a right eye of the user when wearing the head-mounted device. The right display 222 is configured to present a right image of a stereoscopic image to the user.

The head-mounted device may further include a left eye-tracking camera 203 and a right eye-tracking camera 204. The eye tracking cameras are configured to capture images of a the eyes of the user. A left eye image can be analyzed to determine a left eye position of the user wearing the head-mounted device and a right eye image can be analyzed to determine a right eye position of the user wearing the head-mounted device. The left eye-tracking camera 203 is mechanically coupled to a corresponding left eye-tracking IMU 213 and the right eye-tracking camera 204 is mechanically coupled to a corresponding right eye-tacking IMU 214.

The head-mounted device may further include other cameras (not shown) monitoring a user. The other cameras may include any combination of head-tracking camera (i.e., HeT-cam), hand-tracking camera (i.e., HT-cam), head/hand-tracking camera (i.e., HeT/HT-cam), and face-tracking camera (i.e., FT-cam).

Each camera of the head-mounted device 200 may have a corresponding IMU. Each IMU is mechanically coupled to its corresponding camera to monitor a position and orientation (pose) of the camera. As shown, the left VST camera 201 is coupled to a left camera IMU 211 and the right VST camera 202 is coupled to a right camera IMU 212. Likewise each display of the head-mounted device 200 may have a corresponding IMU. The left display 221 is coupled to a left display IMU 231 and the right display 222 is coupled to a right display IMU 232.

The relative pose difference between IMUs (i.e., IMU-IMU extrinsics) may be estimated based on movement measurements measured by different IMUs on the HMD. For example, measurements of the same movement relative to each IMUs frame of reference may be compared to estimate how the frames of reference differ.

Each display of the HMD has a frame of reference. An IMU for a display may have its frame of reference aligned with the display's frame of reference so that movement measured by the IMU may be considered as the movement of the display. For example, the IMU and a display may be included on a common circuit board and the circuit board may be affixed to the frame 240 of the head-mounted device 200. The displays and IMUs are rigidly coupled to a frame 240 of the HMD so that a movement of the HMD may be measured from the perspective of each IMU.

Each IMU can measure different versions of a movement to the HMD and comparing a first measurement of a movement of the left display IMU 231 to a second measurement a movement of the right-display IMU 232 can be used to determine a transformation between the first frame of the left-display IMU 231 and the second frame right display IMU 232. Because each IMU is rigidly coupled to a display. The transformation may describe how each frame is displaced and rotated relative to each other. The displacement from the transformation may be used variously. For example, the displacement, or a display separation derived from the displacement, may be stored in a calibration that can be used to adjust or modify the images displayed and/or the positions of the displays.

Figure 3:
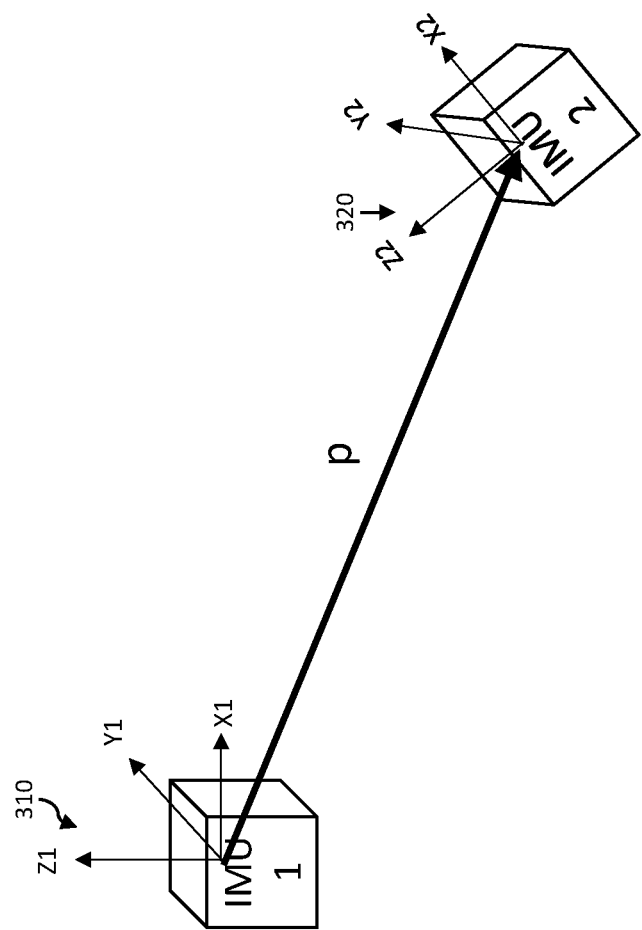
FIG. 3 illustrates relative positions and orientations of two IMUs and their frames according to a possible implementation of the present disclosure.

FIG. 3 illustrates relative positions and orientations of two IMUs and their frames according to a possible implementation of the present disclosure. A first IMU (i.e., $IMU_1$) having a first frame of reference 310 defined by an $x_1$, $y_1$, $z_1$ coordinate system and a second IMU (i.e., $IMU_2$) having a second frame of reference 320 defined by an $x_2$, $y_2$, $z_2$, coordinate system. The three dimensions of the first frame of reference can be aligned with three dimensions (e.g., width (x), length (y), depth (z)) defining the left display; and the three dimensions of the second frame of reference can be aligned with three dimensions defining the right display.

A transformation between the two frames of references (i.e., frame-frame transformation) can include a translation (i.e., displacement) relative to one of the frames. The displacement from the first frame of reference to the second frame of reference may be defined by a vector ($p_{1,2}$) pointing from the origin of the first frame to the origin of the second frame. The transformation between the two frames can further include a rotation ($R_{1,2}$) from the first frame of reference to the second frame of reference.

Figure 4:
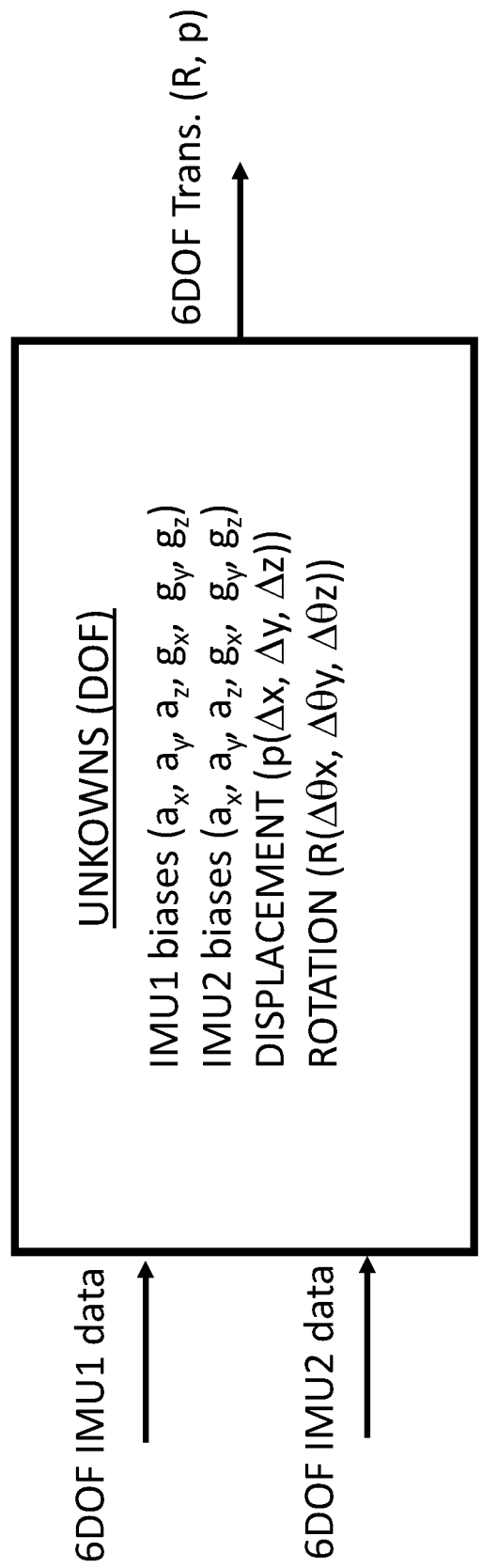
FIG. 4 illustrates a system for computing a transformation between frames based on IMU data from a pair of IMUs according to an implementation of the present disclosure.

FIG. 4 illustrates a system for computing a transformation between frames of reference (i.e. frames) based on IMU data from a pair of IMUs according to an implementation of the present disclosure. As shown, computing the transformation includes receiving 6DOF IMU data from the first IMU ($IMU_1$) and 6DOF IMU data from a second IMU ($IMU_2$). The transformation includes estimating a difference between the first frame (i.e., $IMU_1$ coordinate system ($frame_1$) and the second frame (i.e., $IMU_2$ coordinate system ($frame_2$)), where the difference includes a 3DOF displacement ($\Delta x$, $\Delta y$, $\Delta z$) between the frames and a 3DOF rotation (i.e., $\Delta\theta_x$, $\Delta\theta_y$, $\Delta\theta_z$) between the frames. The computing of the transformation requires estimating biases for the accelerometer ($a_x$, $a_y$, $a_z$) and gyroscope ($g_x$, $g_y$, $g_z$) of $IMU_1$ and $IMU_2$, which could otherwise affect the determination of the frame difference. By solving a system of equations for the unknowns, a 6DOF transformation can be computed. The 6DOF transformation can include 3DOF of translation (i.e., displacement) and 3DOF of rotation.

Computing a complete 6DOF transformation may require solving a system of 15 unknowns. For example, when computing the number of unknowns in the transformation calculation, the translation (i.e., displacements) between the frame may add 3DOF, the rotation (i.e., angles) between the frame may add 3DOF, the biases of the gyroscopes in the two IMUs may add 6DOF, and the biases of accelerometers in the two IMUs may add 6DOF, only 3DOF of which may be computable.

Solving the system of equations can be simplified based on a few assumptions. First, the IMUs are assumed to be mechanically coupled to each other (e.g., in a rigid connection) through a frame of the head-mounted device 200. This mechanically coupling can contain the movement of one of the IMUs relative to the other. For example, a head rotation of a user wearing the HMD will be sensed by each IMU (i.e., $IMU_1$, $IMU_2$) because they are both coupled to the moving frame of the HMD (e.g., via each display).

A Kalman filter may be configured to solve the system of equations by minimizing a first observable to determine the rotation ($R_{1,2}$) required to go from the first frame to the second frame. For example, the Kalman filter may be configured to rotate a frame of reference according to an estimate of the rotation ($R_{1,2}$). If the estimate is perfect then, the observable is zero. Otherwise, the Kalman filter can adjust the estimate (and biases) and then retry the comparison until the observable is minimized. A first observable to determine the rotation ($R_{12}$) between the frames is given in the equation (1) below.

$$y_1(t):=R_{12}(\tilde{\omega}_2(t)-\omega_2^{bias})-(\tilde{\omega}_1(t)-\omega_1^{bias}) \quad (1)$$

The first observable is based on the assumption that the first IMU and the second IMU are attached to the HMD so that the angular velocity of the first IMU is equal to the angular velocity of the second IMU multiplied by a rotation matrix between the first IMU frame and the second IMU frame. The first observable only depends on angular rotation and therefore only requires gyroscope measurements. The terms of the first observable are explained in the table below.

TABLE 1

First Observable Terms

| | |
|---|---|
| $R_{12}$ | Matrix describing the orientation of frame$_2$ with respect to frame$_1$. |
| $\tilde{\omega}_2(t)$ | Gyroscope measurement of IMU$_2$ (including noise and bias). |
| $\omega_2^{bias}$ | Gyroscope bias of IMU$_2$. |
| $\tilde{\omega}_1(t)$ | Gyroscope measurement of IMU$_1$ (including noise and bias). |
| $\omega_1^{bias}$ | Gyroscope bias of IMU$_1$. |

Likewise the Kalman filter may be configured to displace a frame of reference according to an estimate of the displacement ($p_{12}$). If the estimate is perfect, then the observable is zero. Otherwise, the Kalman filter can adjust the estimate (and biases) and then retry the comparison until the observable is minimized. A second observable to determine the displacement ($p_{12}$) between the frames is given in the equation (2) below.

$$y_2(t):=R_{12}\tilde{a}_2(t)-\tilde{a}_1(t)-a^{bias}-(\Lambda(\dot{\tilde{\omega}}_1(t))+\Lambda(\tilde{\omega}_1(t)-\omega_1^{bias})^2)p_{12} \quad (2)$$

The second observable is based on the assumption that the two accelerometers are rigidly attached and thus feel the same linear acceleration, except for displacement-dependent centripetal and tangential accelerations induced by rotation. The second observable depends on angular rotation and acceleration and therefore requires both accelerometer and gyroscope measurements. The terms of the second observable are explained in the table below.

TABLE 2

Second Observable Terms

| | |
|---|---|
| $p_{12}$ | Displacement (translation) of frame$_1$ with respect to frame$_2$. |
| $R_{12}$ | Matrix describing the orientation of frame$_2$ with respect to frame$_1$. |
| $\tilde{a}_2(t)$ | Accelerometer measurement of IMU$_2$ (including noise and bias). |
| $\tilde{a}_1(t)$ | Accelerometer measurement of IMU$_1$ (including noise and bias). |
| $a^{bias}$ | Combined accelerometer bias (=$R_{12} a_2^{bias} - a_1^{bias}$). |
| $\tilde{\omega}_1(t)$ | Gyroscope measurement of IMU$_1$ (including noise and bias). |
| $\dot{\tilde{\omega}}_1(t)$ | First time derivative of $\tilde{\omega}_1(t)$ (angular acceleration). |
| $\omega_1$bias | Gyroscope bias of IMU$_1$. |
| $\Lambda$ | "hat" operator (corresponding to cross product). |
| $R_{12}\tilde{a}_2(t) - \tilde{a}_1(t)$ | Measured difference in linear acceleration. |
| $\Lambda(\dot{\tilde{\omega}}_1(t)) p_{12}$ | displacement-dependent tangential acceleration (= $\dot{\tilde{\omega}}_1(t) \times p_{12}$). |
| $\Lambda(\tilde{\omega}_1(t) - \omega_1^{bias})^2 p_{12}$ | displacement-dependent centripetal acceleration (=$(\tilde{\omega}_1(t) - \omega_1^{bias}) \times ((\tilde{\omega}_1(t) - \omega_1^{bias}) \times p_{12}))$. |

When multiple pairs of IMUs exist then the transforms between a first pair may be based on a transform between other pairs. For example, A system including three IMUs (A, B, C) may have three possible frame transformations (AB, BC, and AC). A transform between a first frame pair (AC) of the three frame pairs (AB, BC, AC) may be a function of (e.g., the sum of) the transform between a second frame pair (AB) and a third frame pair (BC). Accordingly, the method of computing transforms between pairs of cameras, sensors, and/or projectors may be extended mathematically to cover more (e.g., all) possible transformations.

Figure 5:
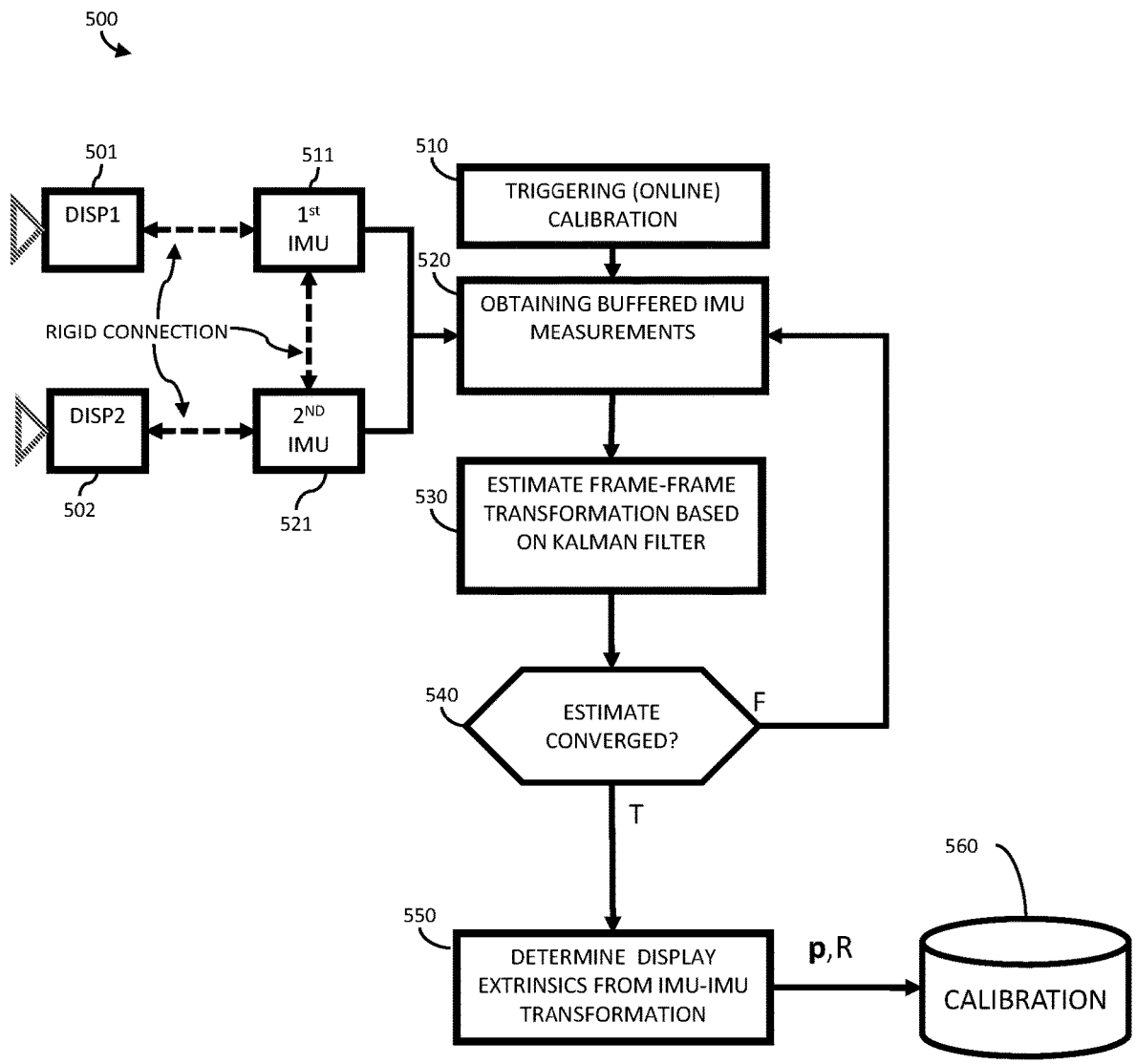
FIG. 5 is a flowchart of a method of online calibration of a head-mounted device according to a possible implementation of the present disclosure.

FIG. 5 is a flowchart of a method of online calibration of a head-mounted device according to a possible implementation of the present disclosure. The method 500 may be performed without participation (or knowledge) of a user. In other words, the method 500 may be transparent to a user. The method 500 may be performed while a user is otherwise using the head-mounted device. In other words, the method 500 may be performed online.

Each iteration of the method 500 may result in an estimate of display frame transformation based on a left-display IMU (i.e., first IMU) and a right-display IMU (i.e., second IMU). In other words, no integration period may be necessary for an estimate, but an estimate may require multiple iterations of the method 500 to converge on an estimate with confidence (i.e., with an error below a threshold).

The method 500 may be performed (i.e., executed) periodically or whenever it is likely that the cameras have shifted from their default (i.e., factory) set positions. Accordingly, the method 500 includes triggering 510 a process to update a calibration corresponding to the relative positions/orientation of the cameras. In other words, the method includes triggering 510 a calibration (e.g., online calibration). The triggering 510 can be based on a change in temperature. In a possible implementation, a temperature sensor 140 is monitored and when the temperature changes more than a threshold a trigger signal may be generated to configure the processor of the smart glasses to perform the calibration. The triggering can also be based on a change in a status of the head-mounted device. For example, a sensor of the head-mounted device may generate the trigger signal when the head-mounted device is transitioned from an idle state (e.g., charging, no movement) to an operating state (e.g., movement, interaction).

The method 500 may further include obtaining 520 (i.e. capturing) a first measurement from a first IMU 511 and a second measurement from a second IMU 521. The first IMU 511 is mechanically coupled to a left display (i.e., first display 501) and the second IMU 521 is mechanically coupled to a right display (i.e., second display 502). For example, the first display 501 and the first IMU 511 may be coupled to a first circuit board and the second display 502 and the second IMU 521 may be coupled to a second circuit board. The first circuit board may be separate from the second circuit board but both circuit boards may be coupled to a body (i.e., frame) of the smart glasses. In this way, the cameras and the IMUs are either directly or indirectly connected in a mechanically stable (i.e., movement is less than a predetermined amount) connection (i.e., rigid connection) so that their movements may be compared.

The first IMU 511 may include an accelerometer module having three accelerometers, each oriented along a dimension of the first IMUs frame of reference. Accordingly, the first measurement may include an acceleration and a bias for each dimension (x, y, z). Likewise, the second IMU 521 may include an accelerometer module having three accelerometers, each oriented along a dimension of the second IMUs frame of reference. Accordingly, the second measurement may include an acceleration and a bias for each dimension (x, y, z).

The first IMU 511 may further include a gyroscope module having three gyroscopes, each oriented along a dimension of the first IMUs frame of reference. Accordingly, the first measurement may further include an angular velocity and a bias for each dimension (x, y, z). Likewise, the second IMU 521 may include a gyroscope module having three gyroscopes, each oriented along a dimension of the second IMUs frame of reference. Accordingly, the second measurement may include an angular velocity and a bias for each dimension (x, y, z).

Obtaining 520 the rotation measurements of a movement of the smart glasses may include buffering the measurements from either (or both) IMUs. Buffering the measurements can synchronize the first measurement and the second measurement in time. The synchronization can help the comparison by improving the likelihood that each measurement corresponds to the same overall movement of the smart glasses.

The method 500 further includes estimating 530 a relative pose difference between the first frame of the first IMU 511 and the second frame of the second IMU 521 (i.e., frame-frame transformation) based on the movement measurements (e.g., buffered rotation measurements). The frames of reference (i.e., coordinate systems) of the IMUs may not be aligned but knowledge of the initial (i.e., factory set) misalignment of the IMUs may be known and used in estimating the display-frame transformation. Further the frame of each IMU may not be aligned with a coordinate system (i.e., frame) of its corresponding display but knowledge of the relative misalignment may be used in estimating the display-frame transformation.

As described previously, the estimating may include applying the first measurement and the second measurement to a Kalman filter. The Kalman filter is configured to output a state that corresponds to a pose transformation between the IMU frames. As mentioned, the method 500 may be iterated in order for the Kalman filter to converge on an estimate (i.e., a solution). Accordingly, the method may include checking 540 the convergence of the Kalman filter to determine if a converged estimate has been obtained. If the estimate is not converged, the method 500 may repeat obtaining measurements and estimating the unknowns (see FIG. 4) based on IMU measurements. In other words, the method 500 may obtain subsequent measurements of the movement of the HMD from the first IMU 511 and the second IMU and apply the subsequent measurement to the Kalman filter until the estimate has converged. In a possible implementation, a convergence of an estimate may be determined when the first observable and/or the second observable reach a minimum (e.g., below a threshold). In another possible implementation a convergence may be determined when the first observable and/or the second observable do not change (e.g., more than a threshold) between iterations.

After the estimate has converged, the method 500 includes determining display extrinsics from the transformation. For example, a displacement ($p_{12}$) between the displays (e.g., left display, right display may be determined from the frame transformation between the first IMU and the second IMU and the rotation between displays. Additionally a rotation ($R_{12}$) between the displays (e.g., left display, right display) may be determined from the frame transformation between the first IMU and the second IMU (i.e., IMU-IMU extrinsics). The display extrinsics ($p_{12}$, $R_{12}$) can be used to write/update a calibration file (i.e., calibration 560) stored in a memory of the HMD.

Values for an initial relative transformation between pairs of IMUs may be stored in the calibration at a time of manufacture. The method may update these values continually or regularly to account for changes due to age (i.e., wear, use), temperature, and the like. Because the disclosed method may be performed while a user operates the smart glasses, it may be referred to as being performed "online". For example, the methods may be used as an online calibration method for determining transformations between the frames of two displays.

Figure 6:
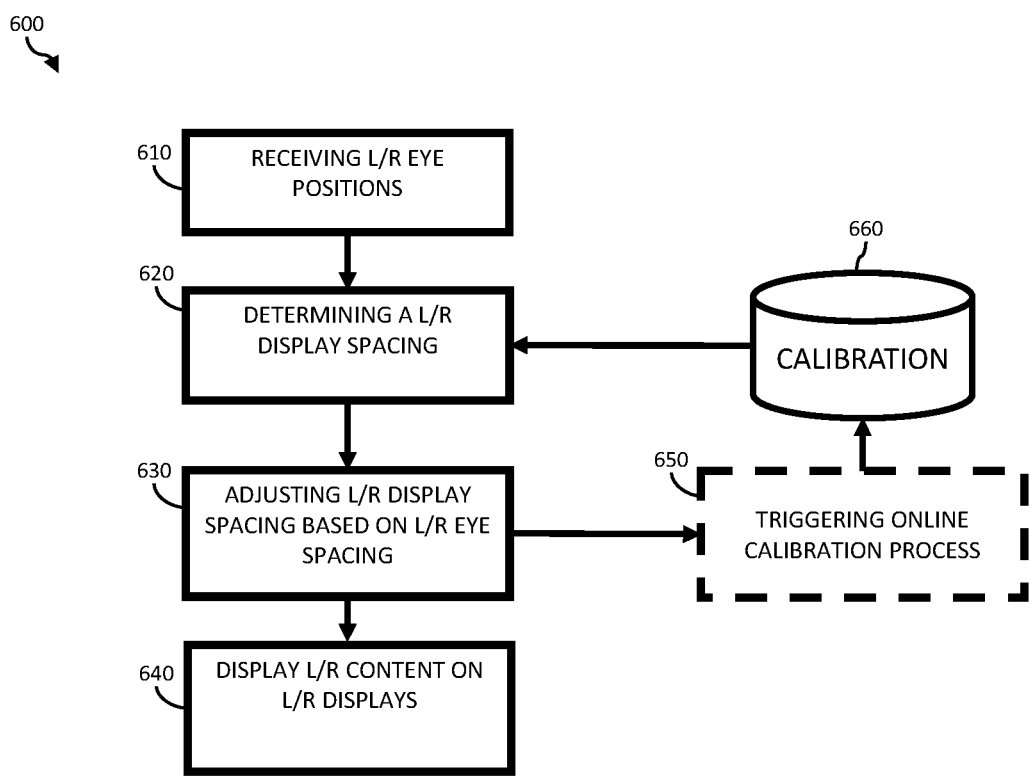
FIG. 6 is a flowchart of a method for automatically adjusting a stereoscopic display separation based on IMU data according to a possible implementation of the present disclosure.

FIG. 6 is a flowchart of a method for automatically adjusting a stereoscopic (i.e. left/right) display separation based on IMU data according to a possible implementation of the present disclosure. The method 600 includes receiving 610 a left eye position and/or a right eye position of a user wearing the HMD 200. The left and right eye positions can include information related to features (e.g., pupil) of the eye in order to determine a spacing between the eyes (i.e., eye spacing) and/or a viewing direction of a user. The left/right eye positions can be measured from left eye images captured by a left eye-tracking camera of the HMD and/or right eye images captured by a right eye-tracking camera of the HMD.

The method 600 further includes determining a display spacing (i.e., distance) between the left display and the right display. The determination may be based on the displacement ($p_{12}$) determined based on the IMU-IMU extrinsics for the displays stored in the calibration 660. In other words, the display spacing may be based on a relative pose difference between the left display and the right display as measured by the left-display IMU and the right-display IMU. Accordingly, the method 600 may include retrieving the results of the frame transformation, including the displacement (i.e., $p_{12}$), from the calibration 660 (e.g., stored in a memory of the HMD).

The method 600 further includes adjusting 630 the spacing between the left display and the right display (i.e., display spacing) based on the eye spacing. The display spacing may be measured as a distance between the center of the first display and the center of the second display. In a possible implementation, the adjustment includes determining a difference between the display spacing and the eye spacing. The adjustment then includes controlling a positioner to mechanically shift one or both of the displays based on the difference. For example, the positioner may mechanically shift one or both of the displays so that the adjusted display spacing matches the eye spacing.

In one possible implementation, the positioner is controlled in an open loop in which a value to reach the target display spacing is transmitted to the positioner and the positioner moves the display without feedback. After the movement, the method 600 can trigger the calibration process (see FIG. 5) to update the stored frame transformation (i.e., display displacement) in the calibration 660. For example, a movement signal (e.g., from the positioner) indicating the end of the movement may trigger an online calibration.

In another possible implementation, the positioner is controlled in a closed loop in which a value to reach the target display spacing is transmitted to the positioner and the positioner moves the display with feedback based on the IMU measurements from one, or both, display IMUs. During the movement, the method 600 can trigger the calibration process (see FIG. 5) to update the stored frame transformation (i.e., display displacement) in the calibration 660 and compare the display displacement to a target value. For example, a signal may be transmitted to the positioner to end the movement when the display displacement reaches a target value (e.g., determined by the eye separation). In either case after the step of adjusting the display are spaced at an adjusted spacing.

The method 600 further includes displaying 640 left/right content (e.g., stereoscopic images) on the left/right displays at the adjusted spacing. The adjusted spacing can align the left/right displays with the left/right eyes of a user, which can result in an enlarged visual field for a user and/or can reduce distortions to the stereoscopic display caused by a misalignment between the display spacing and the eye spacing.

Figure 7:
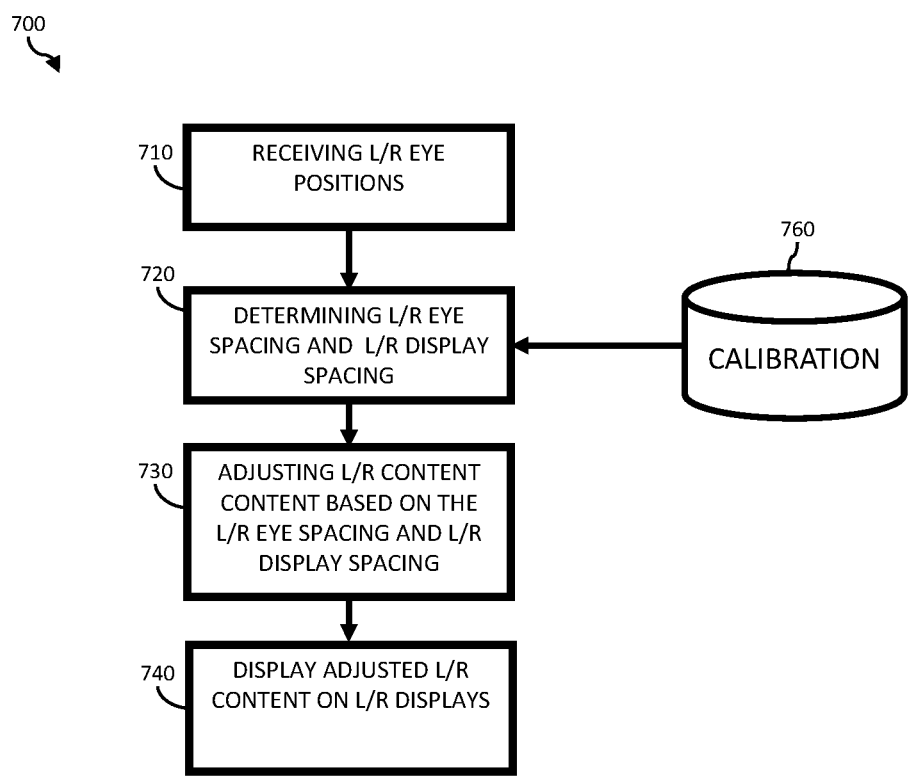
FIG. 7 is a flowchart of a method for automatically adjusting a stereoscopic display content based on IMU data according to a possible implementation of the present disclosure.

FIG. 7 is a flowchart of a method for automatically adjusting a stereoscopic (i.e. left/right) display content based on IMU data according to a possible implementation of the present disclosure. The method 700 includes receiving 710 a left eye position and/or a right eye position of a user wearing the HMD 200. The left and right eye positions can include information related to features (e.g., pupil) of the eye in order to determine a spacing between the eyes (i.e., eye spacing) and/or a viewing direction of a user. The left/right eye positions can be measured from left eye images captured by a left eye-tracking camera of the HMD and/or right eye images captured by a right eye-tracking camera of the HMD.

The method 700 further includes determining 720 a left/right eye spacing based on the received left/right eye positions and a left/right display spacing based on the calibration 760. In particular, the left/right display spacing may be based on the displacement ($p_{12}$) determined based on the IMU-IMU extrinsics for the displays stored in the calibration 760. In other words, the display spacing may be based on a relative pose difference between the left display and the right display as measured by the left-display IMU and the right-display IMU. Accordingly, the method 700 may include retrieving the results of the display-frame transformation, including the displacement (i.e., $p_{12}$), from the calibration 760 (e.g., stored in a memory of the HMD).

The method 700 further includes adjusting 730 the left content (e.g., left image) for display on the left display and right content (e.g., right image) for display on the right display. In other words, adjusting the stereoscopic content presented on the displays. The display spacing may be measured as a distance between the center of the first display and the center of the second display. In a possible implementation, the adjustment includes determining a difference between the display spacing and the eye spacing. The adjustment then includes adjusting a position of the left/right content or another aspect (e.g., magnification, skew, etc.) based on the difference.

Figure 8:
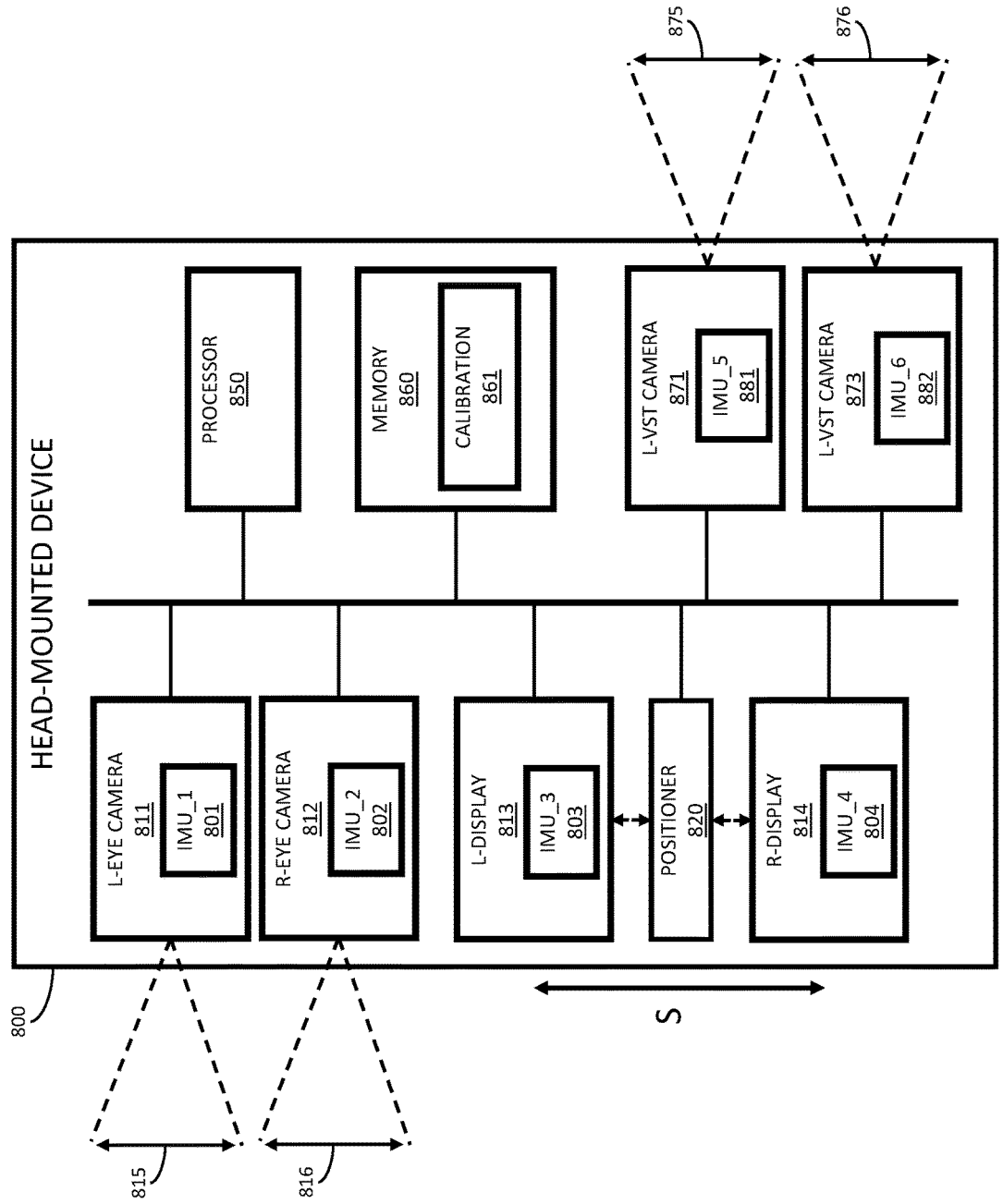
FIG. 8 is a block diagram of a head-mounted device according to a possible implementation of the present disclosure.

FIG. 8 is a block diagram of a head-mounted device according to a possible implementation of the present disclosure. The head-mounted device 800 includes a pair of world facing camera configured to capture stereoscopic images of an environment of a user wearing the head-mounted device. These world images can be displayed (along with virtual content) on a pair of stereoscopic displays so that the user observes the world though a video see-through interface.

The HMD 800 includes a left video see-through (VST) camera (left-VST camera 871) with a left field of view (left FOV 875) directed to an environment of a user. The HMD 800 further includes a right-VST camera 873 with a right FOV 876 directed to the environment. The left FOV 875 and the right FOV 876 may overlap so that the left-VST camera 871 and the right-VST camera 873 can generate stereoscopic content of the environment. The left-VST camera 871 includes a corresponding IMU (i.e., IMU_5 881, IMU_6 882) that are configured to track motion in a frame of reference corresponding to each camera.

The HMD further includes a left display 813 and a right display 814 The displays are arranged so that they can be positioned in front of a user's eyes while the user is wearing the head-mounted device 800. The displays are configured to present stereoscopic content (i.e., images) to a user so that the user can perceive depth via the stereoscopic effect. The left display is coupled to a left-display inertial measurement unit (IMU_3 803) and the right display is coupled to a right-display inertial measurement unit (IMU_4 804). The display IMUs are rigidly coupled to the displays so that movement of the display is sensed by their corresponding IMU. Additionally the IMUs may be aligned with a coordinate system of the display so that a transformation between the frames of reference of the IMUs can be equivalent to the transformation between the frames of reference of the displays.

The displays may be mechanically coupled to a positioner 820. The positioner 820 may be configured to move either (or both) displays. For example, a processor 850 of the head-mounted device 800 may control the positioner 820 to move a prescribed amount to create a spacing between the displays (i.e., display spacing (S)).

It may be desirable for the spacing between the displays to approximately match (e.g., equal) the spacing between a user's eyes (i.e., eye spacing). Accordingly, the head-mounted device 800 may include eye tracking cameras which can help determine the eye spacing based on positions of eye features (e.g., pupil) in the eye images captured by the eye-tracking cameras. The head-mounted device 800 includes a left eye-tracking camera 811 having a left eye FOV 815 directed to a left eye of the user and a right eye-tracking camera 812 having a right eye FOV 816 directed to a right eye of the user. A left eye tracking IMU (IMU_1 801) may be mechanically coupled to the left eye tracking camera 811 and a right eye tracking IMU (IMU_2 802) may be mechanically coupled to the right eye tracking camera 812.

The head-mounted device 800 further includes a memory 860. The memory may be a non-transitory computer-readable medium and may be configured to store instructions that, when executed by the processor 850, can configure the motion tracking device to perform the disclosed methods. For example, the memory 860 may be configured to store the calibration 861 related to the frame transformations between any pair of IMUs on the head-mounted device 800. For example, a display calibration may be stored that has the frame-frame transformation between the left display IMU 803 and the right display IMU 804.

The head-mounted device 200 may further include a communication interface (not shown). The communication interface may be configured to communicate information digitally over a wireless communication link (e.g., WiFi, Bluetooth, etc.). For example, the motion-tracking device may be communicatively coupled to a network (i.e., the cloud) or a device (e.g., mobile phone) over the wireless communication link. The wireless communication link may allow operations of a computer-implemented method to be divided between devices and/or could allow for remote storage of the calibration. In a possible implementation, the head-mounted device are smart glasses, such as augmented-reality glasses.

In accordance with aspects of the disclosure, implementations of various techniques and methods described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A computer readable medium storing executable instructions that when executed by at least one processor, cause the at least one processor to execute operations, the operations comprising:
    receiving a first measurement of a movement of a head-mounted device using a first position sensor coupled to a left display for a left eye of a user of the head-mounted device, the first position sensor having a first frame of reference corresponding to a position and orientation of the left display;
    receiving a second measurement of the movement of the head-mounted device using a second position sensor coupled to a right display for a right eye of the user of the head-mounted device, the second position sensor having a second frame of reference corresponding to a position and orientation of the right display, the first position sensor and the second position sensor being spatially separated;
    determining a transformation between the first frame of reference and the second frame of reference based on the first measurement and the second measurement; and
    determining a display spacing between the left display and the right display based on the transformation.

2. The computer readable medium according to claim 1, wherein the operations further include:
    displaying stereoscopic content on the left display and the right display.

3. The computer readable medium according to claim 1, wherein:
    the first measurement includes a first acceleration and a first angular velocity of the first frame of reference; and
    the second measurement includes a second acceleration and a second angular velocity of the second frame of reference.

4. The computer readable medium according to claim 3, wherein the operation of determining the transformation includes:
    applying the first measurement and the second measurement to a Kalman filter, the Kalman filter configured to:
    output a first observable including an estimated rotation between the first frame of reference and the second frame of reference based on the first measurement and the second measurement; and
    output a second observable including an estimated displacement between the first frame of reference and the second frame of reference based on the first measurement and the second measurement.

5. The computer readable medium according to claim 4, wherein the operation of determining the transformation further includes:
    iterating the determining until the first observable and the second observable are below a convergence threshold.

6. The computer readable medium according to claim 4, wherein the operation of determining the transformation further includes:
    iterating the determining until the first observable and the second observable remain within a change threshold for a number of iterations.

7. The computer readable medium according to claim 1, wherein the first position sensor is a first inertial measurement unit and the second position sensor is a second inertial measurement unit, and the operations further include:

buffering data from the first inertial measurement unit and the second inertial measurement unit to synchronize the first measurement and the second measurement in time.

8. The computer readable medium according to claim 1, wherein the operations further include:

receiving a left eye position of the left eye of the user wearing the head-mounted device and a right eye position of the right eye of the user wearing the head-mounted device;

determining an eye spacing between the left eye and the right eye based on the left eye position and the right eye position; and moving the left display and/or the right display based on the eye spacing and the display spacing, the movement creating a new display spacing between the left display and the right display.

9. The computer readable medium according to claim 8, wherein the operations further include:

triggering an online process to estimate a new transformation between the first frame of reference and the second frame of reference after moving the left display and/or the right display.

10. The computer readable medium according to claim 9, wherein the operations further include:

updating a calibration according to the new transformation, the calibration stored in a memory of the head-mounted device.

11. The computer readable medium according to claim 1, wherein the operations further include:

receiving a left eye position of the left eye of the user wearing the head-mounted device and a right eye position of the right eye of the user wearing the head-mounted device;

determining an eye spacing between the left eye and the right eye based on the left eye position and the right eye position; and adjusting stereoscopic content displayed on the left display and the right display based on the eye spacing and the display spacing.

12. The computer readable medium according to claim 1, wherein the first frame of reference is a first coordinate system having three dimensions aligned with the three dimensions defining the left display; and the second frame of reference is a second coordinate system having three dimensions aligned with the three dimensions defining the right display.

13. A head-mounted device comprising:
a first position sensor coupled to a left display for a left eye of a user, the first position sensor having a first frame of reference;
a second position sensor coupled to a right display for a right eye of the user, the second position sensor having a second frame of reference;
a frame mechanically coupling the left display and the right display and spatially separating the first position sensor and the second position sensor; and
a processor configured by software instructions to perform a display calibration including:
receiving a first measurement of a movement of the head-mounted device using the first position sensor;
receiving a second measurement of the movement of the head-mounted device using the second position sensor;
determining a transformation between the first frame of reference and the second frame of reference based on the first measurement and the second measurement; and
updating a calibration based on the transformation.

14. The head-mounted device according to claim 13, wherein the left display and the right display are included in a stereoscopic display for smart glasses in a video see-through (VST) configuration.

15. The head-mounted device according to claim 13, wherein the first position sensor is a first inertial measurement unit, the second position sensor is a second inertial measurement unit, and wherein:

the first inertial measurement unit is configured to measure a first acceleration of the first frame of reference and a first angular velocity of the first frame of reference; and the second inertial measurement unit is configured to measure a second acceleration of the second frame of reference and a second angular velocity of the second frame of reference.

16. The head-mounted device according to claim 15, wherein to determine the transformation the processor is configured to:

apply the first measurement and the second measurement to a Kalman filter, the Kalman filter configured to:
output a first observable including an estimated rotation between the first frame of reference and the second frame of reference based on the first measurement and second measurement;
output a second observable including an estimated displacement between the first frame of reference and the second frame of reference based on the first measurement and the second measurement; and
iterate the estimated rotation and the estimated displacement until the first observable and the second observable are below a convergence threshold.

17. The head-mounted device according to claim 13, further comprising:

a positioner configured to move the left display and/or the right display;
a left eye-tracking camera configured to measure a left eye position of the user wearing the head-mounted device; and
a right eye-tracking camera configured to measure a right eye position of the user wearing the head-mounted device;
wherein the processor is further configured to:
receive the left eye position and the right eye position of the user wearing the head-mounted device;
determine an eye spacing between the left eye and the right eye based on the left eye position and the right eye position;
determine a display spacing based on a displacement determined from the transformation; and
control the positioner to move the left display and/or the right display based on the eye spacing and the display spacing, the movement creating a new display spacing between the left display and the right display.

18. The head-mounted device according to claim 17, wherein the processor is further configured to:

trigger an online process to estimate a new transformation between the first frame of reference and the second frame of reference after the positioner moves the left display and/or the right display.

19. The head-mounted device according to claim 18, wherein the processor is further configured to:

update the calibration according to the new transformation, the calibration stored in a memory of the head-mounted device.

20. The head-mounted device according to claim 13, further comprising:
a positioner configured to move the left display and/or the right display;
a left eye-tracking camera configured to measure a left eye position of the user wearing the head-mounted device; and
a right eye-tracking camera configured to measure a right eye position of the user wearing the head-mounted device;
wherein the processor is further configured to:
determine a display spacing between the left display and the right display based on a displacement determined from the transformation;
receive the left eye position and the right eye position of the user wearing the head-mounted device;
determine an eye spacing between the left eye and the right eye based on the left eye position and the right eye position; and
adjust stereoscopic content displayed on the left display and the right display based on the eye spacing and the display spacing.

21. A head-mounted device comprising:
a positioner configured to move a left display for a left eye of a user of the head-mounted device or a right display for a right eye of the user of the head-mounted device;
a left eye-tracking camera configured to measure a left eye position of the user;
a right eye camera configured to measure a right eye position of the user;
a first position sensor coupled to the left display for the left eye of the user, the first position sensor having a first frame of reference;
a second position sensor coupled to the right display for the right eye of the user, the second position sensor having a second frame of reference;
a frame mechanically coupling the left display and the right display and spatially separating the first position sensor and the second position sensor; and
a processor configured by software instructions to:
receive a first measurement a movement of the head-mounted device using the first position sensor;
receive a second measurement of the movement of the head-mounted device using the second position sensor;
determine a transformation between the first frame of reference and the second frame of reference based on the first measurement and the second measurement;
determine a display spacing between the left display and the right display based on the transformation;
determine an eye spacing between the left eye and the right eye based on the left eye position and the right eye position; and
control the positioner to move the left display or the right display based on the eye spacing and the display spacing, the movement creating a new display spacing between the left display and the right display.

22. The head-mounted device according to claim 21, wherein:
the head-mounted device is smart glasses in a video see-through configuration; and
the left display and the right display are configured to display stereoscopic content corresponding to a view of an environment.

* * * * *